March 31, 1959 E. G. KESLING 2,879,939

CALCULATOR

Filed March 5, 1954 2 Sheets-Sheet 1

INVENTOR:
ELMER G. KESLING,
BY Kingsland, Rogers & Ezell,
ATTORNEYS

CALCULATOR

Filed March 5, 1954 2 Sheets-Sheet 2

INVENTOR:
ELMER G. KESLING,
BY Kingsland, Rogers & Ezell
ATTORNEYS

United States Patent Office 2,879,939

Patented Mar. 31, 1959

2,879,939

CALCULATOR

Elmer G. Kesling, Richmond Heights, Mo.

Application March 5, 1954, Serial No. 414,279

14 Claims. (Cl. 235—74)

The present invention relates generally to portable calculators, and more particularly to a novel pocket calculator incorporating novel reset structure and to a novel method of zeroing the calculator.

In brief, the present calculator comprises a case including a base and a top in which are mounted dial members, one each for units, tens, hundreds, etc. Each of the dial members has an integral gear, all of the gears being releasably held in the respective positions to which they are advanced in the use of the calculator by a detent device. Intermediate idler gears and a finger on each dial member are provided for transferring additions or subtractions from one dial member to another. Each integral gear is formed with one tooth cut away, in effect, at the bottom portion. A novel reset member is mounted in the case for movement into engagement with the integral gears and for subsequent rotation of the dial members upon movement of the reset device longitudinally of the case. The reset member includes means facilitating disengagement with the gears and means for guiding it to rest position and for maintaining it in such rest position. In the employment of the present novel method of resetting the dial members of the calculator, the reset member is moved into engagement with the gear portions and then moved longitudinally of the case repeatedly until all cut-away portions register with the reset member, so that further manipulation of the latter effects no additional rotation of the dial members. A stylus is carried in the case and is maintained in position against accidental removal by a novel spring and well construction.

Therefore, an object of the present invention is to provide a novel pocket calculator which may be readily zeroed.

Another object is to provide a novel method of zeroing a pocket calculator in which the restricted movement of a reset member is repeated, which simplifies reset methods heretofore employed.

Another object is to provide a pocket calculator incorporating novel positive action reset structure.

Another object is to provide a pocket calculator incorporating reset structure which zeros all of the dial members in a manner to avoid error, and without requiring the user of the calculator to observe the zeroing action.

Another object is to provide a pocket calculator which incorporates novel stylus retaining construction within the calculator case.

Other objects are to provide a pocket calculator which is compact over all, which provides means for carrying a stylus by means of which the dial members are rotated, which may be truly zeroed rapidly and without great attention to the zeroing action, which is relatively inexpensive, which may be readily employed by one in adding, subtracting, and ramifications thereof, and which is otherwise adapted to fulfill the objects and advantages sought therefor.

The foregoing and other objects and advantages are apparent from the following description taken with the accompanying drawings, in which.

Figures 1, 2:
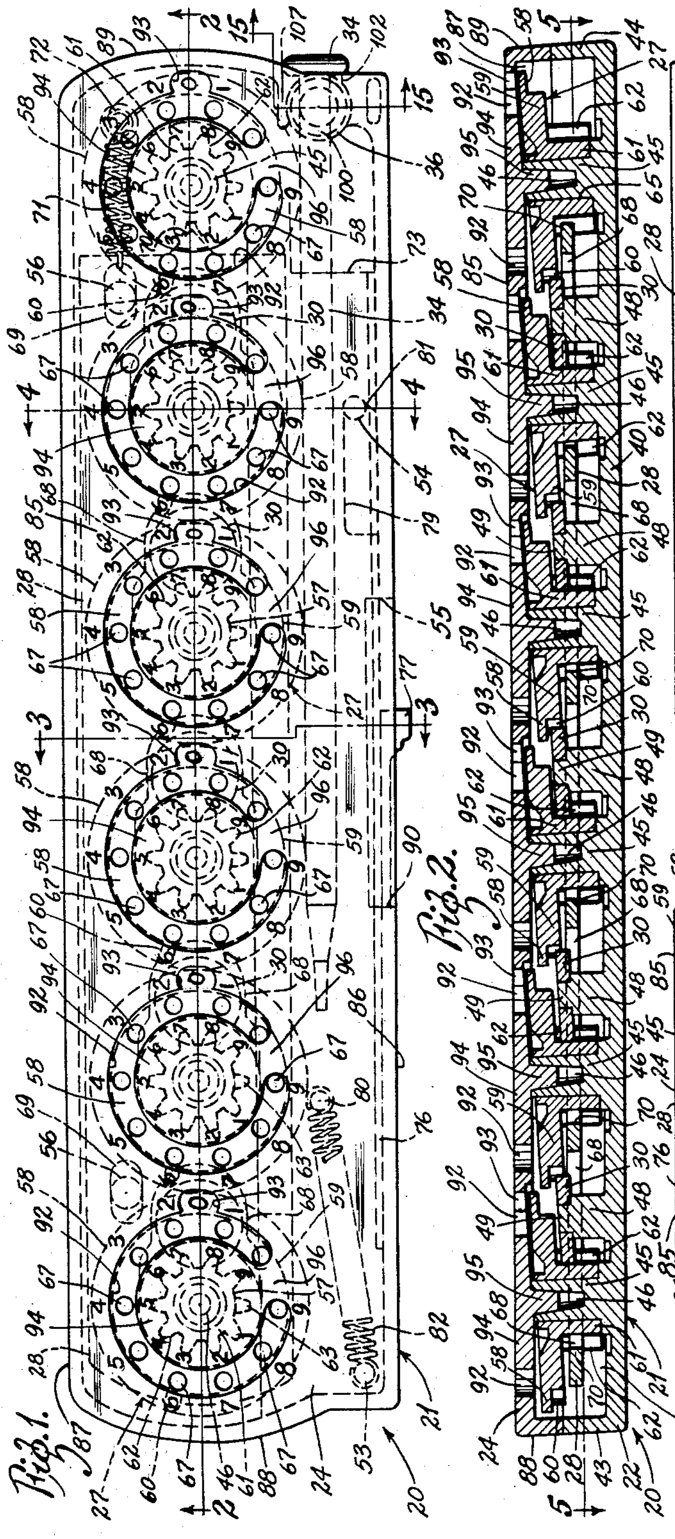
Figure 1 is a plan view on an enlarged scale of a pocket calculator incorporating the concepts of the present invention, certain elements being dotted in to indicate the relative positions thereof.
Figure 2 is a vertical longitudinal cross-sectional view taken on substantially the line 2—2 of Figure 1.

Referring to the drawings more particularly by reference numerals, 20 indicates generally a calculator incorporating the teachings of the present invention. In its broad aspects, the calculator 20 includes a case 21 comprising a base 22 and a cover 24, dial members 27 for units, tens, hundreds, etc., a detent 28, idler gears 30, a zeroing member 32, a stylus 34, and a grip spring 36 which retains the stylus 34 against accidental removal from the case 21. Preferably, the components of the calculator 20 are made of plastic material, with the exception of the springs. Conventional cross-hatching is used in the drawings in the interests of clarity of illustration.

Figures 5, 6, 7, 8, 9, 10, 15:
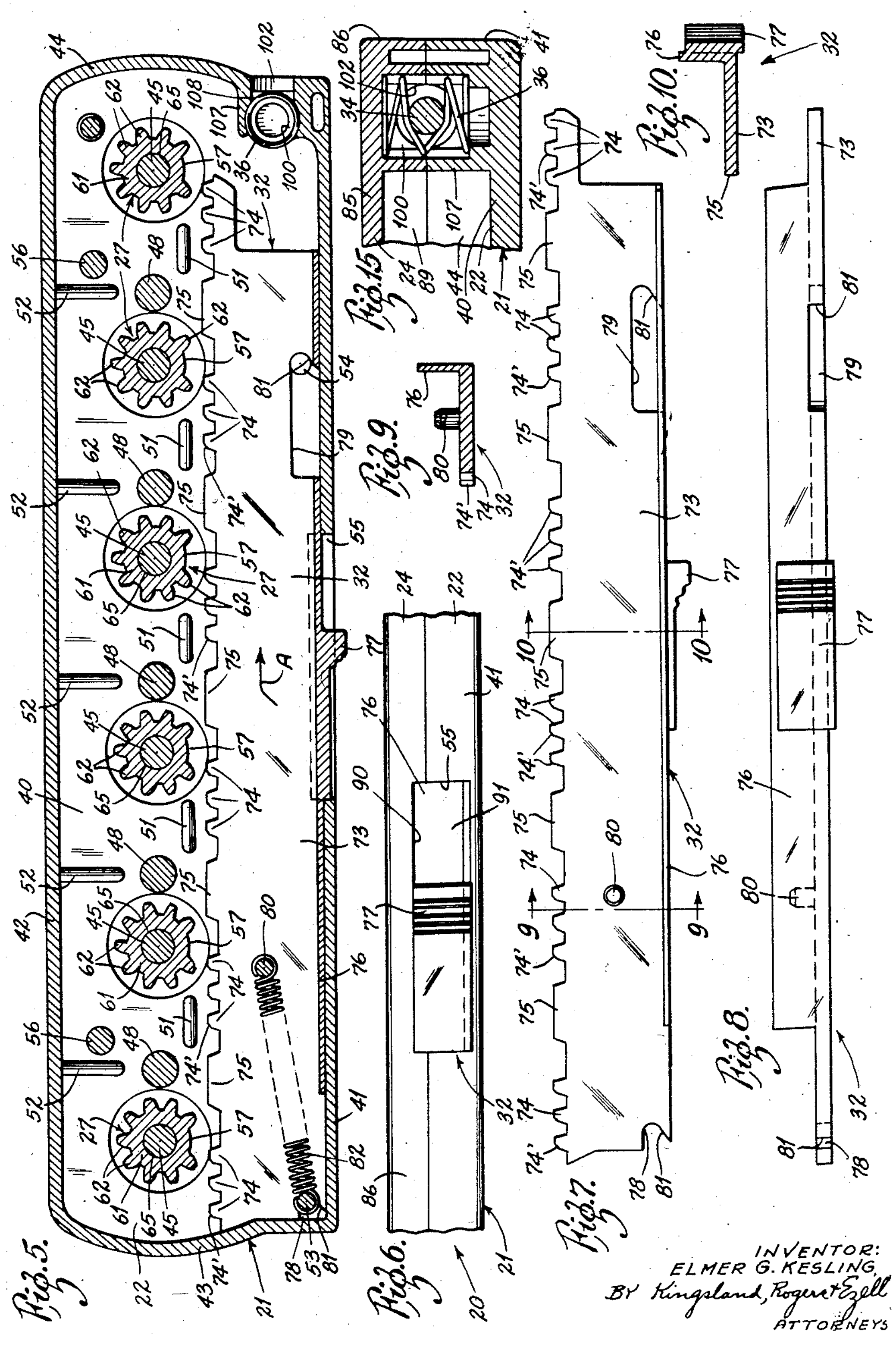
Figure 5 is a horizontal cross-sectional view taken on substantially the line 5—5 of Figure 2.
Figure 6 is a fragmentary front elevational view showing the thumb piece portion of the reset member.
Figure 7 is a plan view of the reset member.
Figure 8 is a side elevational view thereof.
Figure 9 is a vertical transverse cross-sectional view taken on substantially the line 9—9 of Figure 7.
Figure 10 is a vertical transverse cross-sectional view taken on substantially the line 10—10 of Figure 7.
Figure 15 is a further enlarged cross-sectional view on the line 15—15 of Figure 1.

The base 22 is generally rectangular in form and includes a bottom 40, side walls 41 and 42, and end walls 43 and 44. Extending upwardly from the bottom 40 are equi-spaced integral posts 45 which rotatably support the dial members 27, as illustrated. The posts 45 slope slightly longitudinally of the base 22, but are at right angles thereto when viewed transversely, as is clear from Figures 2 and 4, respectively. Each post 45 has a well 46 for a purpose which appears below. There are six posts 45 in the present calculator 20, although a greater or a lesser number may be used, and to one side of each, except the right-hand one, viewing Figure 2, is an integral post 48 having an annular reduced neck 49 inset by a sloping shoulder which rotatably receives a reversing gear 30, as illustrated. Referring to Figure 5, spaced to the right of each post 48 is an integral fin 51 having a height a little greater than the thickness of the reset member 32. Near each post 48 is an integral elongated fin 52, and adjacent each of the two outermost fins 52 is an integral bearing post 56. At the lower left-hand corner of the base 22 is an integral post 53, and at substantially the same distance inwardly of the side 41 is an integral post 54 of a height about equal to the thickness of the reset member 32. The utility of the fins 51 and 52 and of the posts 53, 54 and 56 is set forth below. A centrally located elongated recess 55 is formed in the wall 41.

Figures 3, 4, 11, 12, 13, 14:
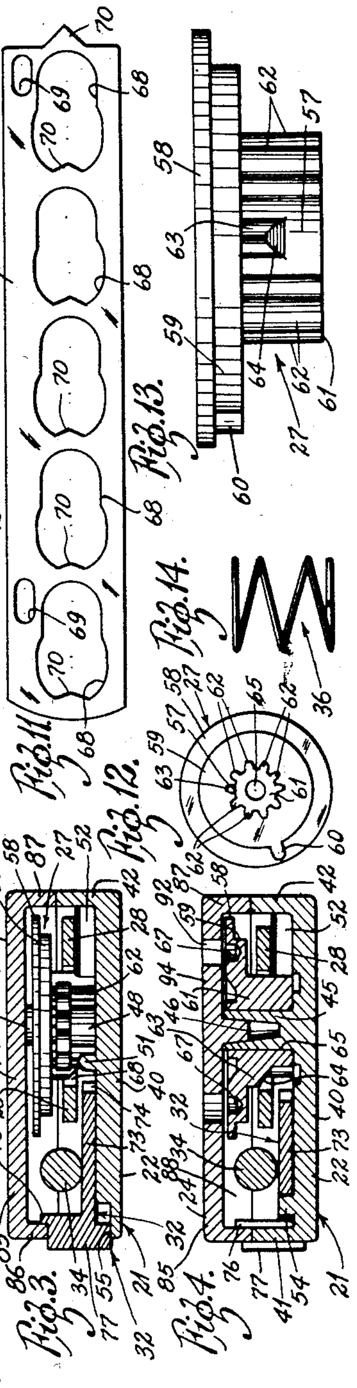
Figure 3 is a vertical transverse cross-sectional view taken on substantially the line 3—3 of Figure 1.
Figure 4 is a vertical transverse cross-sectional view taken on substantially the line 4—4 of Figure 1.
Figure 11 is a plan view of the detent, forming part of the calculator.
Figure 12 is a bottom plan view of a dial member.
Figure 13 is a side elevational view thereof on a further enlarged scale.
Figure 14 is a side elevational view of the stylus retaining spring.

Each dial member 27 includes an upper disc dial portion 58, a lower disc portion 59 of smaller diameter than the disc portion 58 having a transfer finger 60, and a gear portion 61 comprising nine standard teeth 62 and one short tooth 63 which leaves a space and a surface 57 between two teeth 62 at the lower portions thereof, as is clear from Figures 5 and 13. The short tooth 63 is formed with a sloping surface 64 which facilitates molding (Figure 13). A cylindrical opening 65 extends through the dial member 27 by means of which it is freely rotatably mounted upon its respective post 45 (Figure 2). Adjacent the periphery of the upper face of the dial portion 58 are equi-spaced counterclockwise numbers 1 through 9, and 0, and midway between and inwardly of each pair of numbers is a well 67 for receiving a stylus or pencil point. Preferably, the digit dial members 27 are of integral construction. Note that an idler gear 30 engages each gear portion 61, except the right-hand one, and is engageable at its right side by a transfer finger 60.

The detent 28 may be of the same type as is disclosed in the applicant's Patent No. 2,588,539, and is in the form of a flat plate having elongated openings 68 therein, each of which is large enough to receive a gear portion 61 and an idler gear 30 in a manner to permit free longitudinal movement of the detent 28. Elongated openings 69 are provided which receive the bearing posts 56. Detent angles 70 are formed, one each for engagement with the upper part of the gear portion 61 of the respective dial member 27. It is to be noted that the detent angles 70 are of increasing angle from right to left, Figure 11, which is the relationship shown in the applicant's above-mentioned patent.

Referring to Figure 1, the detent 28 is biased into engagement with the upper part of the gear portions 61 by a tension spring 71, one end of which is hooked into the end wall of the right opening 69 and the other end of which is secured to the upper reduced part of a post 72 formed integral with the bottom 40. Note that the detent 28 rests upon the above-mentioned fins 51 and 52 as bearing supports, and that the bearing posts 56 extend into the openings 69.

The reset member 32 is illustrated in detail in Figures 5–10, and preferably is of integral plastic construction. The reset member 32 includes an elongated flat plate 73 having spaced groups of gear teeth 74 alternating with elongated extension stops 75 along one edge. The gear teeth 74 are formed with an angled surface 74' on their left face so they more readily release from the gear teeth 62 under the biased return action of a tension spring 82, one end of which is connected to the post 53 and the other to a post 80 integral with the plate 73. This described edge of the reset member 32 is loosely held down by the overlapping adjacent edge of the detent 28 (Figures 3 and 4). Along the other edge is a vertical flange 76, on the outer face of which is formed an operating thumb piece 77, as illustrated. At the lower left-hand corner of the plate 73 is a notch 78 and near the other end is an elongated recess 79, each of which is formed with a sloping wall 81, as shown in Figure 7.

The relationship of the reset member 32 to the base 22 and the dial members 27 is clearly shown in Figures 3 and 5. The plate portion 73 rests upon the bottom 40 with the thumb piece 77 extending through an opening 91 in the front side of the calculator 20, a major portion of which is the recess 55 in the side wall 41. The tension spring 82 biases the reset member 32 into the position shown in Figure 5 with the notch 78 in engagement with the post 53 and the right end of the elongated recess 79 engaging the post 54, with the sloping walls 81 extending around and beneath said posts.

The cover 24 has a top 85, side walls 86 and 87, and end walls 88 and 89. The side wall 86 has an elongated recess 90, which forms the upper part of the above-mentioned opening 91. The top 85 is formed with equi-spaced arcuate slots 92, opening into each of which is a small recess 93. The recesses 93 are the windows through which the sum or difference attained is viewed. Each arcuate slot 92 defines a disc portion 94 which is joined to the rest of the top 85 by a neck 96. Each disc portion 94 has an integral frusto-conical post 95 depending therefrom which extends into the well 46 of the respective post 45 to align the cover 24 and to provide anchoring support for the disc portions 94. Each disc portion 94 has numbers 1 through 9 adjacent the periphery in clockwise relation opposite nine of the ten wells 67 (Figure 1). It will also be noted that numerals 1 through 9 are formed on the top 85 counterclockwise along the outer edge of each arcuate slot 92 opposite nine of the wells 67. The cover 24 is cemented to the base 22.

The spring 36 is free in the well 100 and requires no anchoring means, being positively retained between the base 22 and cover 24.

Viewing Figure 5, an inner wall 107 forms with the end portions of the side walls 41 and 86 a longitudinal rectangular passageway 108 in the near right-end corner of the calculator 20. The passageway 108 connects with the outside through a smaller circular opening 102 in the end walls 44 and 89. A vertical spring well 100 is formed in the rectangular passageway 108 which receives the grip spring 36. The stylus 34 extends through the opening 102 and through the spaced coils of the spring 36 which firmly grip it and prevent accidental removal from the case 21.

The idler gears 30 have eight teeth in the present embodiment, although they may have a different number. The gear portions 61 of the dial members 27 have ten teeth so that a transfer of accumulated sums placed at each revolution in accordance with our arithmetical system.

*Operation*

It is obvious from the foregoing that the present calculator 20 functions in respect to addition, subtraction, and the like, in the same manner as the calculator shown in the applicant's above-mentioned Patent No. 2,588,539. That is, to add figures with the calculator 20 to obtain a sum, units are accumulated on the right-hand or units dial member 27, tens on the dial member 27 immediately to the left thereof, hundreds on the next dial member 27, etc. As a simple problem, to add 122 and 242, place the stylus 34 in the well 67 of the units dial member 27 opposite the numeral 2 of the counterclockwise series and rotate the dial member 27 clockwise until the stylus 34 engages the neck 96 as a stop. Similarly, 2 is placed in the tens dial member 27, and 1 in the hundreds dial member 27. The same procedure is repeated for the numerals 242 of the second number, and the total of 364 will appear through the respective recesses 93. If a figure is to be subtracted, the respective dials 26 are operated in an opposite direction by insertion of the stylus into the wells opposite the respective clockwise series numbers.

Assuming that it is desired to clear this sum of 364 from the calculator 20, the thumb is placed on the thumb piece 77 and the reset member 32 is moved a little to the right and up into engagement with the teeth of the gear portions 61, and the movement thereof is then continued to the right, as is indicated by the arrow A of Figure 5. When the right-hand wall of the thumb piece 77 strikes the right end wall of the opening 91, the thumb piece 76 is released and the spring 82 returns the rest member 32 by pulling the surfaces 74' over the ends of the adjacent teeth 62 and finally to the rest position of Figure 5. This cycle movement of the reset member 32, as just detailed, is repeated until there is no engagement of the teeth 74 with the teeth 62 of the gear portions 61, which will indicate that the calculator 20 has been zeroed and the gear portions 61 are in the positions as shown in Figure 5. A maximum of three movements of the reset member 32 is required to zero the calculator 20, although this objective may be accomplished by one movement of the reset member 32 when the gear portions 61 require only to be rotated an arc equivalent to from one to about three teeth to return them to zero position.

The fins 51 are engaged by the extension stops 75 to limit the lateral inward movement of the reset member 32. The notch 78 and the right end of the recess 79 engage the posts 53 and 54, respectively, on return movement under the bias of the spring 82, whereupon the sloping walls 81 glide along said posts 53 and 54 and insure return of the reset member 32 to a defined normal position for further use. Additionally, the sloping walls 81 under bias of the spring 82 prevent accidental movement of the reset member 32 laterally into the path of the gear portions 61 during use of the calculator 20.

The mounting of the stylus 34 in the coils of the spring 36 is considered to be a novel feature. The stylus 34 spreads the coils of the spring 36 when it is inserted through the opening 102, and the frictional engagement of the latter with the former maintains the stylus 34 against accidental removal from the case 21. There is adequate room in the case 21 above the reset device 32, as is clear from the drawings. This feature insures the presence at all times of a device for manipulating the calculator 20.

It is apparent that there has been provided calculator construction which fulfills the objects and advantages sought therefor.

It is understood that the foregoing description and the accompanying drawings have been given by way of illustration and example. It is also to be understood that changes in form of the elements, rearrangement of parts, and steps, and substitution of equivalent elements and steps, which will be obvious to those skilled in the art, are contemplated as within the scope of the present invention which is limited only by the claims which follow.

What is claimed is:

1. In a calculator, in combination, a case, a plurality of dial members rotatably mounted in said case, means rotatably mounted adjacent said dial members cooperative therewith to effect computation, a reset member for zeroing said dial members mounted in said case for reciprocative movement therein, spring means biasing said reset member into rest position, and interengaging means cooperable with said spring means for retaining said reset member against movement transversely of said case when in said rest position.

2. In a calculator, in combination, a case, a plurality of dial members rotatably mounted in said case, means rotatably mounted adjacent said dial members cooperative therewith to effect computation, a reset member for zeroing said dial members mounted in said case for reciprocative movement therein, said reset member including asymmetrically formed operative teeth having one side double sloped for facilitating releasing action, means biasing said reset member into rest position, and a thumb piece forming part of said reset member for reset movement thereof.

3. In a calculator, in combination, a case, a plurality of dial members rotatably mounted in said case, each dial member including a gear portion having equally spaced teeth of substantial length, one tooth being shorter than the rest thereby providing a gap between two full length teeth, means rotatably mounted adjacent said dial members cooperative therewith to effect computation and engageable with all the teeth of a respective gear portion, a detent member engageable with all the teeth of said gear portions, and a reset member in said case biasingly movable into rotative engagement with the teeth portions of all of said gear portions in that portion of each exclusive of said short tooth.

4. In a calculator, in combination, a case, a plurality of dial members rotatably mounted in said case, each dial member including a gear portion having equally spaced teeth of substantial axial length, one tooth being shorter in axial length than the rest thereby providing a gap between two full length teeth, means rotatably mounted adjacent said dial members cooperative therewith to effect computation and engageable with all the teeth of a respective gear portion, a reset member in said case biasingly movable into rotative engagement with the teeth portions of all of said gear portions in that portion of each exclusive of said short tooth, and means biasing said reset member into rest position.

5. In a calculator, in combination, a case, a plurality of dial members rotatably mounted in said case, each dial member including a gear portion having equally spaced teeth of substantial axial length, one tooth being shorter in actual length than the rest thereby providing a gap between two full length teeth, means rotatably mounted adjacent said dial members cooperative therewith to effect computation and engageable with all the teeth of a respective gear portion, a reset member in said case movable into rotative engagement with the teeth portions of all of said gear portions in that portion of each exclusive of said short tooth, means biasing said reset member into rest position, and interengaging means cooperable with said biasing means for retaining said reset member against movement transversely of said case when in said rest position.

6. In a calculator, in combination, a case, a plurality of dial members rotatably mounted in said case, each dial member including a gear portion having equally spaced teeth of substantial length, one tooth being shorter than the rest thereby providing a gap between two full length teeth, means rotatably mounted adjacent said dial members cooperative therewith to effect computation and engageable with all the teeth of a respective gear portion, a reset member in said case biasingly movable transversely of the case into rotative engagement with the teeth portions of all of said gear portions in that portion of each exclusive of said short tooth, said reset member being also movable longitudinally of the case in a resetting operation, means biasing said reset member in to rest position, and a thumb piece forming part of said reset member for both bias and longitudinal reset movements thereof.

7. In a calculator, in combination, a case, a plurality of dial members rotatably mounted in said case, each dial member including a gear portion having equally spaced teeth of substantial length, one tooth being shorter than the rest thereby providing a gap between two full length teeth, means rotatably mounted adjacent said dial members cooperative therewith to effect computation and engageable with all the teeth of a respective gear portion, a reset member disposed for both bias and longitudinal movement in said case for selective rotative engagement with the teeth portions of all of said gear portions in that portion of each exclusive of said short tooth, said reset member including teeth engageable with said gear portions upon actuation of said reset member, and obstructing means in said case disposed to prevent transverse engagement of said reset member with said gear portions when said reset member is in rest position.

8. In a calculator, in combination, a case, a plurality of dial members rotatably mounted in said case, each dial member including a gear portion having equally spaced teeth of substantial length, one tooth being shorter than the rest thereby providing a gap between two full length teeth, means rotatably mounted adjacent said dial members cooperative therewith to effect computation and engageable with all the teeth of a respective gear portion, a reset member disposed for both bias and longitudinal movement in said case for selective rotative engagement with the teeth portions of all of said gear portions in that portion of each exclusive of said short tooth, said reset member including spaced sets of teeth each being engageable with a gear portion upon actuation of said reset member, obstructing means in said case disposed to prevent transverse engagement of said reset member with said gear portions when said reset member is in rest position, and means for limiting longitudinal reciprocable movement of said reset member.

9. The combination of claim 1 wherein the interengaging means comprises separable post and slot means whereby the reset member cannot be moved transversely of said case when in said rest position.

10. The combination of claim 9 wherein the post and slot means comprises spaced posts fixed in the case and cooperative slots formed in the reset member, said slots having at least a portion of one side formed at an angle both to the longitudinal and transverse axes of the case.

11. In a calculator, in combination, a case, a plurality of dial members rotatably mounted in said case, means rotatably mounted adjacent said dial members cooperative therewith to effect computation, a reset member for zeroing said dial members mounted in said case for both longitudinal and diagonal reciprocative movement therein, spring means returning said reset member longitudinal toward rest position, and sloping means cooperative with said spring means for guiding said reset member diagonally into final rest position.

12. In a calculator, in combination, a case, an elongated plurality of dial members rotatably mounted in said case, means rotatably mounted adjacent said dial members cooperative therewith to effect computation, an elongated reset member for zeroing said dial members mounted in said case for both longitudinal and lateral reciprocative movement therein, means biasing said reset member into rest position, and a thumb piece forming part of said reset member positioned for moving the same in one direction of both its longitudinal and lateral reset movement, said biasing means being effective to return said reset member to rest position upon release of said thumb piece following use of said reset member.

13. In a calculator, in combination, a case, a plurality of dial members rotatably mounted in said case, each dial member including a gear portion having equally spaced teeth of substantial length, one tooth being shorter than the rest thereby providing a gap between two full length teeth, means rotatably mounted adjacent said dial members cooperative therewith to effect computation and engageable with all the teeth of a respective gear portion, a reset member in said case movable into rotative engagement with the teeth portions of all of said gear portions in that portion of each exclusive of said short tooth, means biasing said reset member into rest position, and a thumb piece forming part of said reset member for reset movement thereof, said biasing means being effective to return said reset member to rest position upon release of said thumb piece following use of said reset member.

14. The combination of claim 12 wherein the dial members and the reset member are provided with interengageable teeth, wherein the lateral movement of the reset member effects toothed engagement and disengagement between the reset member and the dial members, and wherein the longitudinal movement of the reset member may effect rotation of the dial members when the reset member and the dial members are in toothed engagement.

References Cited in the file of this patent

UNITED STATES PATENTS

| | | |
|---|---|---|
| 772,643 | Dement | Oct. 18, 1904 |
| 818,249 | Hull | Apr. 17, 1906 |
| 997,068 | Lemaignen | July 4, 1911 |
| 1,095,545 | Baum et al. | May 5, 1914 |
| 1,764,915 | Vethe | June 17, 1930 |
| 1,974,239 | Gorbatchewsky | Sept. 18, 1934 |
| 1,991,806 | Kottmann | Feb. 19, 1935 |
| 2,348,299 | Josepho | May 9, 1944 |

FOREIGN PATENTS

| | | |
|---|---|---|
| 129,481 | Australia | Oct. 14, 1948 |